United States Patent [19]

McPherson

[11] Patent Number: 4,712,217
[45] Date of Patent: Dec. 8, 1987

[54] SYSTEM FOR TRANSMITTING DIGITAL INFORMATION AND MAINTAINING A MINIMUM PAULSE DENSITY

[75] Inventor: Thomas R. McPherson, Redwood City, Calif.

[73] Assignee: Network Equipment Technologies, Redwood City, Calif.

[21] Appl. No.: 811,914

[22] Filed: Dec. 20, 1985

[51] Int. Cl.$^4$ ............................................. G06F 11/10
[52] U.S. Cl. ........................................ 371/55; 375/81; 375/90; 375/102
[58] Field of Search ...................... 371/55, 57; 375/81, 375/102, 90, 80; 455/212, 218

[56] References Cited

U.S. PATENT DOCUMENTS

| | | | |
|---|---|---|---|
| 3,405,235 | 10/1986 | Carter | 371/55 |
| 3,893,171 | 7/1975 | Marshall | 371/55 |
| 3,924,080 | 12/1975 | Caldwell . | |
| 3,961,203 | 6/1976 | Hutch | 371/55 |
| 3,995,264 | 11/1976 | Ouchi | 371/55 |
| 4,353,129 | 10/1982 | Nishiwaki . | |
| 4,502,142 | 2/1985 | Csengery | 371/55 |
| 4,554,540 | 11/1985 | Mori | 371/55 |
| 4,554,665 | 11/1985 | Beesley | 371/55 |

Primary Examiner—Michael R. Fleming
Attorney, Agent, or Firm—Townsend & Townsend

[57] ABSTRACT

A system having an encoder and a decoder for transmitting ordered data blocks therebetween and for maintaining a minimum pulse density without increasing the bit error rate (BER). The encoder detects critical word having zeros in all bit positions except the least significant bit (LSB) position, constrains the LSB in a critical word having a zero in the LSB position from zero to one to maintain the minimum pulse density, generates an LSB word with each bit in LSB word representing non-constrained LSBs of the critical words in the data block and with the positions of bits in the LSB word corresponding to the order of transmission of the critical words in the data block. The decoder receives the LBS word and data block and converts the constrained LSB according to the indication of the respective bit in LSB word to reduce the BER.

4 Claims, 12 Drawing Figures

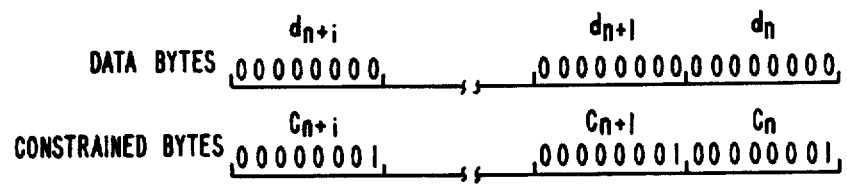
FIG._1.
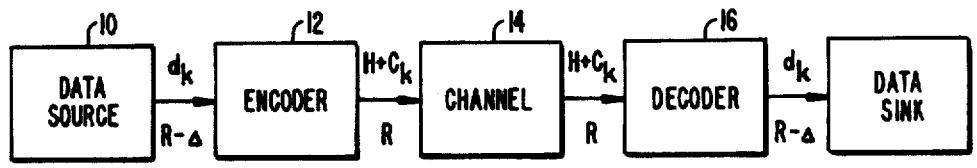
FIG._2.
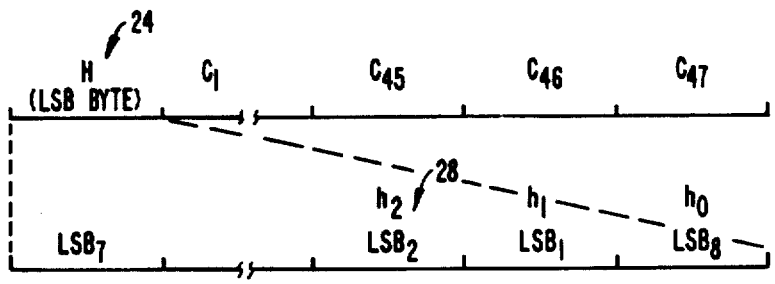
FIG._3.
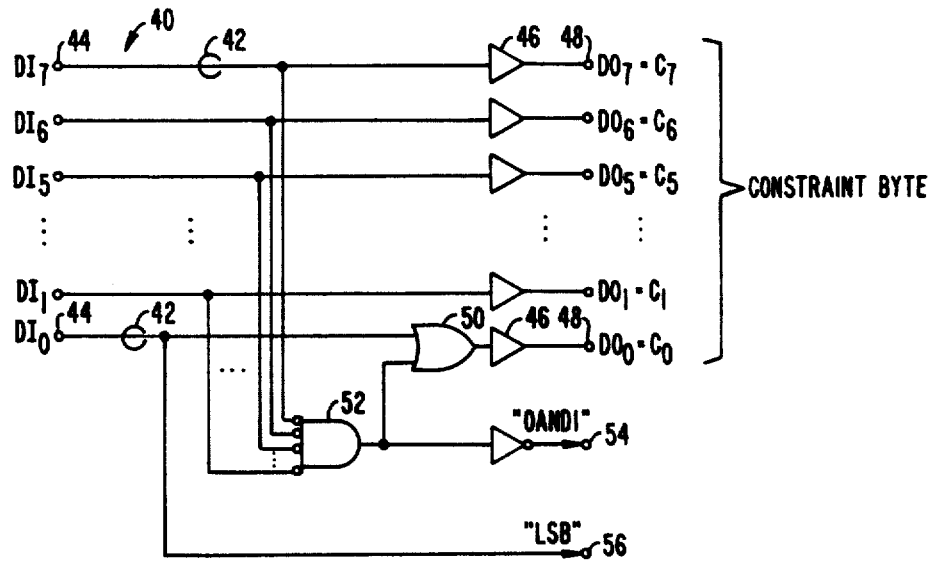
FIG._4.

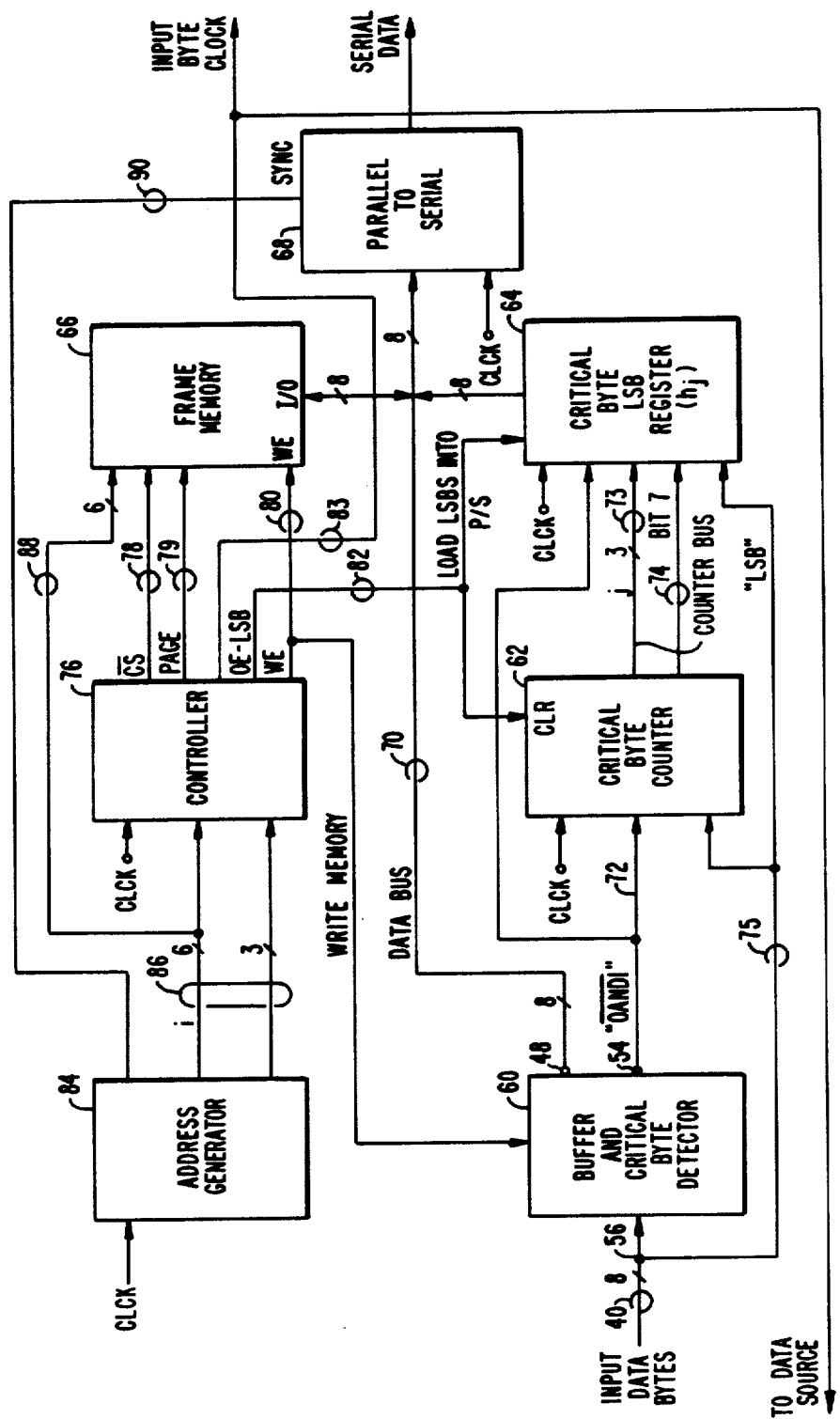
FIG._5.

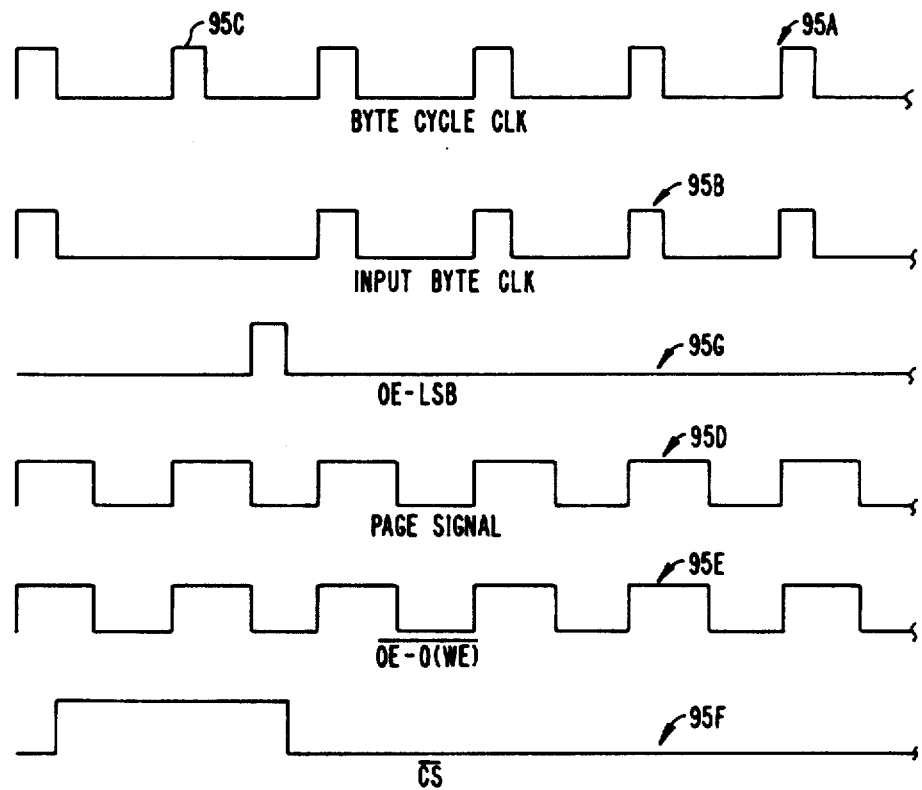
FIG._5A.

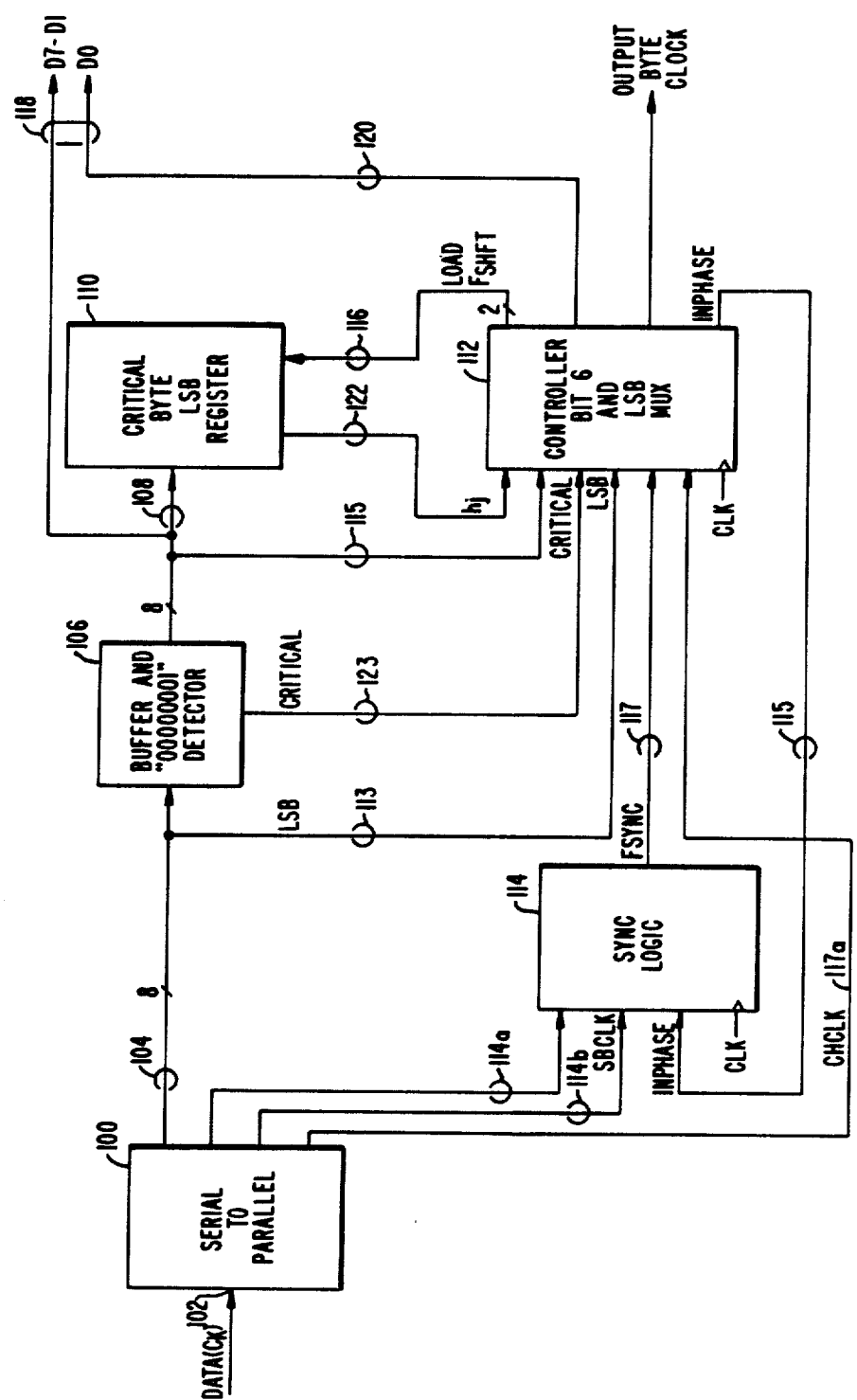
FIG._6.

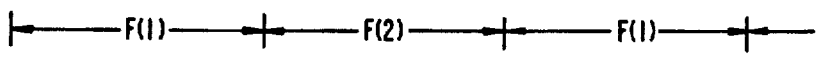
FIG._7A.
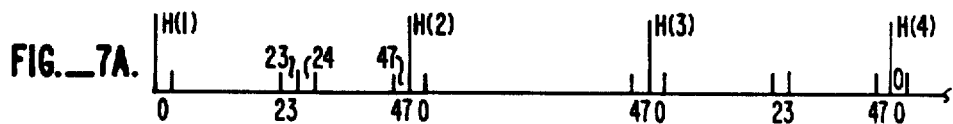
FIG._7B.
FIG._7C.
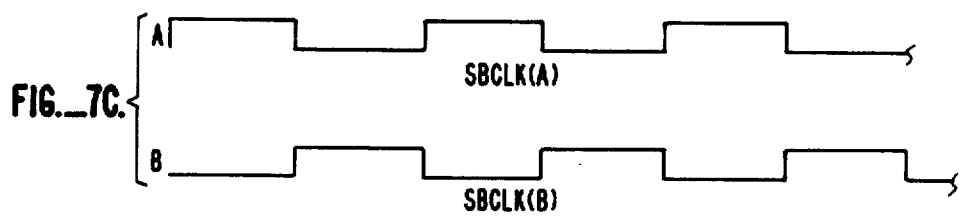
FIG._7D.
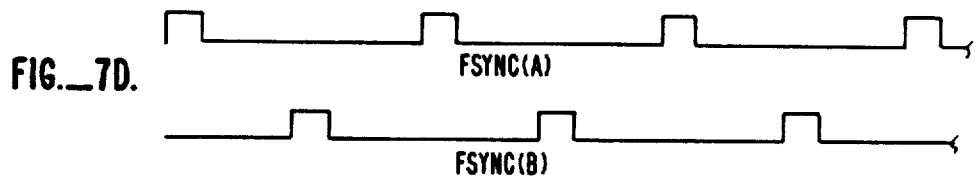
FIG._8.
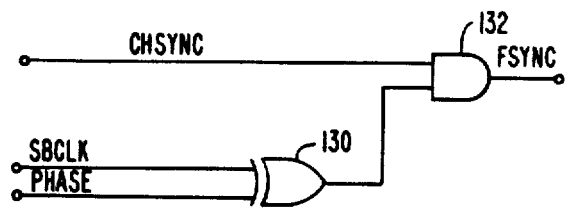

SYSTEM FOR TRANSMITTING DIGITAL INFORMATION AND MAINTAINING A MINIMUM PAULSE DENSITY

BACKGROUND OF THE INVENTION

1. Field of the Invention

The present invention relates generally to systems for maintaining minimum pulse densities in digital communication systems and, more particularly, relates to a system for efficiently maintaining a minimum pulse density without substantially increasing the bit error rate (BER) of the digital communication system.

2. Description of the Relevant Art

Regenerative repeaters for digital communication systems typically require some minimum pulse density to preserve timing information sufficient to regenerate pulses below a specified BER. One example of a minimum pulse density requirement is set forth in the specification for the AT&T T1 Transmission System. The T1 specification relates to a data format having frames formed by bytes of eight bits each. The data is transmitted at a fixed rate of 1.544 Mbps. The minimum pulse density constraint requires that no more than fifteen consecutive ZEROs may be generated and that an average pulse density of one pulse in eight be maintained. Other constraints relate to framing bits and signaling information.

Existing systems for maintaining pulse density requirements typically change specified ZEROs in the data stream to ONEs when required to maintain the minimum pulse density.

One obvious drawback to such a ones forcing scheme is an increase in the bit error rate (BER) due to the arbitrary changing of specified bits from a ZERO to a ONE. Various systems for minimizing this increase in the BER exist in the prior art.

One system is disclosed in a patent to Caldwell entitled "Zero Suppression In Pulse Transmission Systems," U.S. Pat. No. 3,924,080. The Caldwell system utilizes the principle of artificial data block definition to avoid forcing ONEs unnecessary to achieving the required pulse density. By avoiding forcing unnecessary ONES the system in Caldwell reduces the increase in the BER.

Another prior art system for maintaining minimum pulse density requirements is disclosed in the patent to Nishiwaki entitled "Digital Data Transmission System," U.S. Pat. No. 4,353,129. Nishiwaki relates to a video pulse transmission system in which transmission of pulse data is effected through a buffer memory. In that system, if too many ZEROs occur in succession, a dummy bit is inserted in the data steam to maintain the minimum pulse density requirement. The system also tags a status bit to indicate the presence of the dummy bit to the receiver. The receiver removes the dummy bit from the data stream to prevent undesired increases in the BER.

The system of Nishiwaki transmits data at a variable rate, depending on the number of dummy bits inserted in the bit stream. Additionally, Nishiwaki is not directed to a word organized data stream as is present in the T1 System and utilizes a significant portion of the bandwidth as overhead.

In some applications, any increase in the BER due to the arbitrary insertions of ONEs into the data stream is unacceptable. Accordingly, a system that maintains minimum pulse density requirements without substantially increasing the BER or overhead requirement is greatly needed in the communications industry.

SUMMARY OF THE INVENTION

The present invention is a system for maintaining a minimum pulse density rate in an ordered data block that forces selected "0"s to "1"s. The system generates a constraint encoding word that is utilized at the receiver end to convert the forces "1"s back to "0"s. Thus, the pulse density constraint is maintained without increasing the BER. The necessity of transmitting the constraint encoding word does not decrease the data transmission rate by an appreciable amount.

According to one aspect of the invention, an ordered data block of data words is supplied to a constraint encoder. Herein, a numeral indicates the hexidecimal notation while a numeral in quotes indicates the binary notation, e.g., 5 is the same as "00000101." Alternatively, the 8 bit binary representation may be indicated by $P_m$ where m is a number in decimal notation, e.g. $P_5$ is the same as "00000101." In the present system, bytes or words having value $P_0$ or $P_1$ are oritioal bytes (CB) with $CB(0) = P_0$ and $CB(1) = P_1$. It is the CB(0)s that are of concern because of CB(0) is represented by a string of "0"s in the data block. This string of "0"s may violate the pulse density constraint.

According to a further aspect of the invention, the encoder stores the LSBs of each detected CB in an LSB word. This LSB word functions as the constraint encoding word. The LSBs are stored in the order that the CBs are detected. The LSB of each CB(0) is forced from a "0" to a "1" so that each CB(0) is forced to CB(1). The data block including the forced CB(1)s is an ordered constrained data block of constrained data words that satisfied the pulse density constraint.

According to a further aspect of the invention, the encoder forms a frame including the LSB word and the constrained data words and transmits the frame via a transmission channel.

In one embodiment, a decoder, coupled to a transmission channel, receives a frame including an LSB word and an ordered data block of constrained data words. The LSB is stored, words in the constrained data block equal to $P_1$ (CB(1)) are detected, and the LSB bit of each CB(1) is replaced by a bit from the LSB word. The LSB of the first detected CB(1) is replaced by first bit in the LSB word.

In general, the LSB of the nth detected CB(1) is replaced by the nth bit of the LSB word.

According to a further aspect of the invention, the constrained data words are stored at the encoder until the LSB word has been generated. In each frame, the LSB word is transmitted first, followed by the ordered block of constrained data words.

According to a further aspect of the invention, the decoder frames the received constrained data words so that the LSB word is positioned first in the frame.

According to a further aspect of the invention, the LSB word is stored in a register in the encoder. A high order bit of the stored word is monitored to determine whether the stored LSB word is a CB(0).

According to a still further aspect of the invention, the MSB, of an LSB word equal to $P_0$, is forced to a "1" to prevent the LSB word from violating the pulse density constraint.

3

Other advantages and features of the invention will be apparent from the drawings and following detailed description of the preferred embodiments.

BRIEF DESCRIPTION OF THE DRAWINGS

FIG. 1 is a block diagram illustrating the T1 pulse density constraint.

FIG. 2 is a block diagram of the invention.

FIG. 3 is a block diagram depicting the format of the transmitted data.

FIG. 4 is a circuit diagram of a circuit for imposing the constraint on the incoming data, for detecting the CBs in the incoming data block, and for providing the LSB of each byte in data block as an output signal.

FIG. 5 is a block diagram of the encoder 12.

FIG. 5A is a timing diagram illustrating the operation of the coder.

FIG. 6 is a block diagram of the constraint decoder 16.

FIG. 7 is a timing diagram illustrating the framing operation.

FIG. 7A is a timing diagram illustrating the organization of the data received at the decoder 16.

FIGS. 7B and 7C are timing diagrams depicting signals generated by a T1 receiver 100.

FIG. 7D is a timing diagram showing signals FSYNC(A) and FSYNC(B).

FIG. 8 is a diagram of a logic circuit for implementing the framing operation.

DETAILED DESCRIPTION OF THE PREFERRED EMBODIMENTS

The present invention is a system for constraining a transmitted data stream to have a required pulse density and for removing the constraint at the receiver to maintain a low BER.

In a preferred embodiment, the pulse density constraint is defined by the T1 specifications. Data is organized into bytes having 8 bits each. The transmission rate is 1.544 Mbps.

FIG. 1 illustrates the T1 pulse density constraint. No more than 15 "zeros" in a row may be transmitted, and for every time window of (n+1) bytes, at least n "ones" must be present. As described above, $P_m$ is the binary representation of the decimal number m.

In FIG. 1, the incoming 8 bit data bytes in an ordered data block are designated $d_k$ and the constrained data bytes are designated $c_k$. The $c_k$s appear in the same order in the constrained data block as the $d_k$s appeared in the incoming data block. The present system imposes the pulse density constraint on a block of forty-seven bytes.

Unconstrained byte $d_n$ is the first byte in the data block equal to $P_0$. The system converts the value of $d_n$ from $P_0$ to $P_1$ by forcing the value of the LSB of $d_n$ from "0" to "1." The byte $c_n$ is the binary representation of $d_n$ after the LSB is forced. For data bytes $d_k$ not equal to $P_0$, $c_k$ is the same as $d_k$.

The constrained data block $[c_k]$ meets the pulse density constraint and is transmitted over a communication channel.

When the constrained data block is received, the constrained bytes, $c_k$, having value $P_1$ may represent a data byte, $d_k$, having a value of either $P_1$ or $P_0$, depending on whether or not the LSB of the data byte, $d_k$, was forced to meet the constraint. Accordingly, the constraint increases the bit error rate (BER) of the communication system because some of the original $d_k$s equal to $P_0$ will be received as $d_k$s equal to $P_1$.

In certain applications this increase of the BER is intolerable. The present invention substantially reduces the increase of the BER due to the imposition of the pulse density constraint.

FIG. 2 is a block diagram of the invention. A data source 10 provides a data block, at rate R-Δ, to a constraint encoder 12. The constraint encoder transmits data, at rate R, over a communication channel 14. A constraint encoder 12 receives data transmitted over the channel 14. The constraint decoder 16 provides data to a data sink 18, at rate R-Δ.

An overview of the invention will now be presented with reference to FIG. 2. The invention will be described in greater detail below with reference to FIGS. 3-6.

The constraint coder 12 imposes the pulse density constraint on the data block, $d_k$, to form the constrained data block, $[c_k]$. The constrained data block, $[c_k]$, is transmitted over the T1 channel 14 and received at the constraint decoder 16.

As described above, received bytes, $c_k$, having the value $P_1$, are ambiguous, i.e., the received constrained byte may represent a data byte equal to $P_0$ or $P_1$. To remove this ambiguity, the encoder 12 transmits additional data in a header byte, H, that is used by the decoder 16 to determine whether a $c_k$ having value $P_1$ represents a dk having value $P_1$ or $P_0$.

The data transmission rate is reduced by Δ, where Δ is the bandwidth used to transmit the decoding data, H. Thus, the effective data transmission rate is reduced from R, the channel rate, to R-Δ. The quantity Δ/R is the overhead associated with the system.

The present invention reduces the increase in BER to substantially zero while minimizing overhead.

FIG. 3 depicts the format of the transmitted data. Each frame 22 includes 48 bytes. The first byte in each frame is the constraint encoding byte 24, H (LSB byte). The remaining forty seven bytes are constrained data bytes 26.

The constraint encoding byte 24 includes bits 28 $LSB_0$ through $LSB_7$. At T1 rates, a delay of 250 microseconds is required to generate the constraint coding byte 24. The overhead in this format is 2% or 32 kbps.

As described above, data bytes, $d_k$, having value $P_0$ are converted to constrained bytes, $c_k$, having value $P_1$. At the receiver, the value of the constrained byte is ambiguous, it may be $P_0$ or $P_1$. Accordingly, data bytes having values $P_0$ or $P_1$ are critical bytes, CBs.

If a particular $d_k$ in the incoming data block is a CB(0), i.e. $d_k=P_0$, then the encoder forces the LSB of the particular $d_k$ from "0" to "1." The byte $c_k$, corresponding to the particular $d_k$, transmitted by the encoder 12 is equal to $P_1$. Accordingly, each $d_k$ that is equal to $P_0$, CB(0), is forced to a $c_k$ equal to $P_1$. The LSB of a $d_k$ equal to $P_1$, CB(1), is not forced. The LSBs of the critical bytes in the data block are stored in the LSB byte 24. The order of the LSBs 28 in the LSB byte corresponds to the order of the CBs in the data block. That is, the bit $LSB_0$ is the LSB of the first CB in the data block. The bit $LSB_1$ is the LSB of the second CB in the data block. In general, the jth bit, $LSB_j$, is the LSB of the (j+1) CB in the data block.

To minimize the BER the data supplied by the data source 10 to the coder 12 should be random. If the data is not naturally random, then it can be randomized by, for example, a synchronized scrambler.

For a randomized system that forces a ONE upon detecting a string of M ZEROs, the following BERs result:

| M = 16 | $1.5 \times 10^{-5}$ |
|---|---|
| M = 24 | $6.0 \times 10^{-8}$ |
| M = 32 | $2.3 \times 10^{10}$ |

The present invention causes no increase in the BER if no more than 8 CBs appear in a data block. A 9th CB in the data block will cause the encoding byte to overflow because the encoding block can only store 8 bits. However, with random data the probability of overflow is only one data block in $8.8 \times 10^9$ (once every 25 days at T1 rates). In the event of overflow, LSBs from the ninth and succeeding critical bytes in the received data block are ignored and encoding byte is not updated. The increase in the BER is negligible.

FIG. 4 is a circuit diagram of a circuit for imposing the pulse density constraint on the incoming data, for detecting the CBs in the incoming data block, and for providing the LSB of each byte in data block as an output signal.

Referring now to FIG. 4, data bus 40 includes data lines 42 $DI_0$ through $DI_7$. Each line in the data bus 40 is connected to a data input terminal 44. Lines 1 through 7 are coupled to an output buffer 46, with the output of the buffer 46 coupled to output terminal 48. The 0th line in the data bus 40 is coupled to a first input of an OR gate 50. The output of the OR gate 50 is coupled to a buffer 46 with the output of the buffer 46 coupled to output terminal 48. Data lines 1 through 7 42 are coupled to the inverted inputs of an AND gate 52. The output of the AND gate 52 is coupled to a second input of OR gate 50 and also to a detecting signal output port 54 with the detecting signal designated $\overline{0AND1}$. The 0th data line is coupled to an LSB output port 56.

The output signal from the AND gate 52 is always low unless the bits on data bus lines 1 through 7 are all equal to "0." In that case, the output from the AND gate 52 goes high. Note that for a CB(0) or a CB(1) the bits on data bus lines 1 through 7 are all equal to "0." Accordingly, the output of AND gate 52 is clocked high whenever a critical byte is placed on the data bus 40. The output of the AND gate 52 functions as a gating signal for the OR gate 50. When the output from the AND gate 52 is low the output signal from the OR gate 50 is equal to the signal on the 0th line of the data bus. However, when the output of the AND gate 52 is clocked high then the output of the OR gate 50 is equal to one.

If the data byte, $d_k$, is not equal to a critical byte, then the output of the AND gate 52 is low, the OR gate is transparent, and the constraint byte, $c_k$, is the same as the data byte, $d_k$. However, if the data byte, $d_k$, is a critical byte, then the output signal from the AND gate 52 swings high, and the output of the OR gate is equal to 1. Thus, if the critical byte on the data bus 40 has the value $P_1$, then the constraint byte, $c_k$, also has the same value as the critical byte. If the critical byte has the value $P_0$, then the constrained byte, $c_k$, has the value $P_1$. The OR gate 50, gated by the high output of the AND gate 52, forces a CB(0) to a CB(1) by forcing the LSB of the CB(0) from a "0" to a "1." Accordingly, the circuit of FIG. 4 has imposed the pulse density constraint on the data bytes.

The output signals at output ports 54 and 56 are utilized by the encoder to construct the constraint encoding byte 24.

FIG. 5 is a block diagram of the encoder 12. Referring now to FIG. 5, a buffer and critical byte detector 60, critical byte counter 62, critical byte LSB register 64, frame memory 66, and parallel to serial transmitter 68 are coupled to an eight-line data bus 70. A critical byte line 72 couples the detecting signal, $\overline{0AND1}$, output port 54 to the critical byte counter 62 and the critical byte register 64. A j bus 73 and BIT7 line 74 connect critical byte counter 62 outputs to critical byte register 64 inputs. An LSB line 75 couples LSB output port 56 to a critical byte counter 62 input and to a critical byte register 64 input. A controller 76 has outputs coupled to frame memory 66 input by $\overline{CS}$, page, and $\overline{OE\text{-}LSB}$ lines 78, 79, and 80. The $\overline{OE\text{-}O(WE)}$ line 80 is also coupled to the buffer and critical byte detector 60. An $\overline{OE\text{-}LSB}$ control line 82 couples a controller 76 output to a critical byte counter 62 input and a critical byte register 64 input. Additionally, an input byte clock line 83 is coupled to a data source (not shown).

An address generator 84 has outputs coupled to controller 76 input by a nine bit bus 86, to frame memory 66 input, by a six bit bus 88 and to parallel to serial transmitter 68 inputs by a SYNC line 90. A clock signal input is provided to the address generator 84, the critical byte counter 62, the critical byte register 64, the controller 76, and the parallel to serial transmitter 68.

The operation of the circuit depicted in FIG. 5 will now be described.

The buffer and critical byte detector 60 functionally duplicates the OR gate 50, AND gate 52, buffers 46, and input and output ports 44 and 48 of the circuit depicted in FIG. 4. The incoming data bytes, $d_k$, are coupled to the inputs of the buffer and critical byte detector 60 by the data bus 40.

As described above, the encoder 12 constrains bytes of data to meet the pulse density constraint and generates a constraint byte H for use in decoding the constrained data. The forty seven bytes of constrained data and constraint byte, H, form a 48 byte frame.

The address generator 84 operates off the clock signal to provide overall system timing. The controller 76 generates control signals to activate the various components of the coder during specified points in a frame forming cycle.

At the start of the frame forming cycle, a signal on the $\overline{OELSB}$ is clocked to set the index, j, in the critical byte counter 62 to "0" and to activate critical byte register 64.

The interaction of the critical byte detector 60, critical byte counter 62, and critical byte register 64 will now be described for three cases.

In a preferred embodiment, the CB register 64 is an addressable register. The LSB line 75 is coupled to the serial input and data bus 70 is coupled to the parallel output.

In the first case, the data byte is not a CB. From the discussion of FIG. 4, the critical byte detector 60 does not alter $d_k$ and the $\overline{0AND1}$ signal on critical byte line 72 is not asserted. The index, j, of the critical byte counter 62 remains at "0" and the critical byte register 64 remains cleared.

In the second case, the data byte, $d_k$, is a CB(1). The critical byte detector 60 does not alter the data byte, $d_k$. However, the signal $\overline{0AND1}$ on critical byte line 72 is asserted. The $\overline{0AND1}$ signal causes the critical byte register 64 to latch the LSB of the DB(1), i.e., "1," present on the LSB line 74 into the jth position of the constraint byte H. The index value, j, is provided by the counter bus 73. Since j is ZERO, $h_0$ is the LSB of $d_k$, i.e. "1." The $\overline{0ANDI}$ signal causes the critical byte counter to increment j from "000" to "001."

In the third case the data byte, $d_k$, is a CB(0). The critical byte detector 60 forces the CB(0) to a CB(1). The $\overline{0ANDI}$ signal is asserted to cause the critical byte register 64 to latch the LSB of the $d_k$, i.e. "0," present on the LSB line 74 into the jth position of the constraint byte, H. Since j is one, $h_1$, is the LSB of the $d_k$, i.e., "0." Again, the $\overline{0ANDI}$ signal causes the critical byte register 64 to increment j from "001" to "010."

As the CBs appear in the data block at register 64, the LSBs of the CBs are stored in the constraint byte H. The order that CBs appear in the data block corresponds to the order that the stored LSB from each CB appears in the constraint encoding byte, H. The index j orders the $h_j$s to correspond to the order of the CBs in the constrained data block.

In the present embodiment, the constraint byte H is the first byte transmitted in the frame and is followed by the forty seven bytes of constrained data. Accordingly, the transmission of the constrained data bytes must be delayed until the constraint encoding byte, H, is generated.

This delay is accomplished by utilizing the frame memory 66. The frame memory 66 is configured as a ping-pong memory. Consider two consecutive frames, F(1) and F(2). During a first frame cycle, forty seven constrained data bytes are written into the memory 66 while the constraint encoding byte for F(1), i.e., H(1), is being formed in the critical byte register 64.

When all forty seven constrained bytes have been stored, the $\overline{OE\text{-}LSB}$ signal is asserted to transfer the constraint encoding byte, H(1), to the parallel to serial transmitter 68 and begin a second frame cycle.

The transmitter then transmits F(1) by transmitting H(1) followed by the 47 constrained data bytes of F(1). During the second frame cycle, the memory 66 is cycled to output the forty seven constrained data bytes of F(1) and to store the forty seven constrained data bytes of F(2). Synchronization is provided by the address generator 84 driven controller 76. The transmitted frame is of the form depicted in FIG. 3.

FIG. 5A illustrates the implementation of this delay. In FIG. 5A, the byte cycle clock 95A defines the timing of the latching of bytes of data into the transmitter 68. The input byte clock 95B tracks the input byte clock 95A except for the first pulse 95C in a 48 byte frame 22. The pulses of the input byte clock 95A cause the external data supply to provide one byte of input data to the buffer and critical byte detector 60. Thus, at the beginning of the frame 22, no input data is supplied the buffer and critical byte detector 60 while the byte H is transmitted.

Input data is transferred from the buffer and critical byte detector 60 to the transmitter 68 via the frame memory 66.

A new partial address signal (AP) is supplied to frame memory 66 during address cycles occurring between pulses of the byte cycle clock 95A. The MSB of the complete address is define by the state P of a page signal 95D. The complete address signal is thus (P)(AP). The page signal defines two pages in the frame memory 66 with addresses in the first page having addresses of the form (0)(AP) and addresses in the second page of the form (1)(AP).

The page signal 95C assumes both states during an address cycle. Thus, the page signal causes the pages of the frame memory to be flipped during each address cycle.

The $\overline{OE\text{-}O(WE)}$ signal 95E changes state in phase with the page signal 95D. When $\overline{OE\text{-}O(WE)}$ is low the buffer and critical byte detector 60 drives a byte of data onto data bus 70 and the frame memory 66 writes the data byte into the first page of the memory. When OE-O(WE) 95E is high, the outputs of the buffer and critical byte detector 60 are disabled and the second page is read onto the bus 70. The transmitter 68 latches this data and transmits it in serial fashion. The data being written into the first page is F(2), and the data being read from the second page is in F(1).

As described above, during the first period in a frame 22, the byte H corresponding to F(1) is to be transferred. The $\overline{CS}$ signal 95F is asserted during the address cycle defined pulse 95C to disable the frame memory 66. The $\overline{OE\text{-}LSB}$ pulse is asserted to transfer the LSB byte (H) of F(1) onto the data bus 70. The byte H is thus transmitted first followed by the constrained data bytes $[c_k]$ of F(1).

The data source provides random data to the encoder 12. If no CBs or only CB(0)s are present in a given frame, then H is equal to $P_0$. Thus, H itself could cause a violation of the pulse constraint. To avoid this possibility the encoder forces the MSB of H to be a "1" if the first seven bits of H are zero.

This forcing is accomplished as follows. The LSB of the latest CB in the data block is registered in the critical byte counter 62 and applied to the BIT7 line 74. The critical byte register sets the value of $h_7$ to the state of the BIT7 line if $h_0$ through $h_6$ are not all equal to "0." However, if $h_0$ through $h_6$ are all equal to "0", then $h_7$ is set to "1."

FIG. 6 is a block diagram of the constraint decoder 16. In FIG. 6 a serial to parallel receiver 100 receives serial input data at input port 102 and provides byte organized output data on a first data bus 104. The first data bus 104 includes data lines $D_1(0)$ through $D_1(7)$. The first data bus 104 is coupled to the input of a buffer and CB(1) detector 106. The output of the buffer and CB(1) detector 106 is coupled to second data bus 108 comprising lines $D_2(0)$ through $D_2(7)$. The eight lines of the second data bus $D_2(0)$ through $D_2(8)$ are coupled to the input of a critical byte LSB register 110.

The $D_1(0)$ line of the first data bus 104 is coupled to a LSB input of a controller and LSB MUX 112 by a LSB line 113. A SYNC logic unit 114 has inputs coupled to the CHSYNC and SBCLK outputs of the receiver 100 by CHSYNC and SBCLK lines 114a and 114b. A BIT6 line 115 couples the $D_2(6)$ line of the second data bus 108 to a BIT6 input of the controller and LSB MUX 112. A phase input of the SYNC logic unit 114 is coupled a phase output of controller and LSB MUX 112 by a phase line 115. The critical byte LSB register 110 and the controller and LSB MUX 112 are coupled by a LOAD AND SHIFT CONTROL bus 116. An FSYNC output of the sync logic 114 is coupled to an FSYNC input of the controler 112 by FSYNC line 117. A CHCLK output of the serial to parallel 100 is coupled to a CHCLK input of the controller and LSB MUX 112 by a CHCLK line 117a.

An eight-bit decoder output port 118 includes bit outputs B7-B1 coupled to lines $D_2(1)$ through $D_2(7)$ of the second data bus 108. The BO output of the output port 118 is coupled to an LSBO output of the controller and LSB MUX 112 by LSBO line 120. An $h_j$ input of the controller and LSB MUX 112 is coupled to critical byte register 110 output by an $h_j$ line 122. A CRITICAL output of the CB detector 106 is coupled to a CB input of the controller 112 by CRITICAL line 123.

The operation of the decoder depicted in FIG. 6 will now be described. The critical byte register 110 is a parallel to serial shift register. The parallel input is coupled to the second bus 108 and the serial output is coupled to the $h_j$ line 122. The controller 112 generates control signals that are routed to the critical byte register by the LOAD AND SHIFT CONTROL bus 116. The timing of the control signals is controlled by an FSYNC signal generated by the SYNC logic unit 114 and routed to the controller 112 by the FSYNC line, by the CB signal 123, and by the CHCLK signal 124.

When a new frame is received, the sync logic unit 114 signals the controller to generate a LOAD signal on the LOAD AND SHIFT CONTROL bus 116. The critical byte register 110 then latches the first byte in the frame, i.e., the constraint byte, H. The register 110 places the bit, $h_0$, on the $h_j$ line 122 which is coupled to the LSB input of controller and LSB MUX 112.

The received constrained data bytes are placed on the first data bus 104 and are directed to the inputs of the buffer and CB(1) detector 106. The LSB of each constrained data byte is directed to the LSB input of the controller and LSB MUX 112 by the LSB line 113.

The CB(1) detector includes a circuit equivalent to the circuit of FIG. 4. The CRITICAL signal on the critical byte line 123 is asserted if a CB(1) is on the first data bus 104.

The controller and LSB MUX 112 multiplexes the signals at its $h_j$ and LSB inputs onto the LSBO output line 120. The signal CRITICAL is the MUX control signal. If CRITICAL is not asserted, then the signal on the LSB input is multiplexed onto the LSBO output line 120. If CRITICAL is asserted, then the signal at the $h_j$ input is multiplexed onto the LSBO output line.

Also, if the CRITICAL signal is asserted, then controller 112 generates a shift signal which is routed to the critical byte register 110 by the LOAD AND SHIFT CONTROL bus 116. This shift signal causes the next bit in the constraint encoding byte to be shifted to the serial output, $h_j$, of the CB register 110.

The interaction of the CB(1) detector 106, the critical byte register 110, and controller and LSB MUX 112 will now be described for two cases.

In the first case, assume that the constrained data byte on the first data bus 104 is not a CB(1). The first seven bits of the data byte are transferred to the lines $D_2(1)$-$D_2(7)$ of the second data bus 108 by the CB(1) detector 106 and placed on the D1-D7 outputs of the output port 118.

The LSB of the constrained data byte is routed to the LSB input of the controller and LSB MUX 112 on the LSB line 113. Because the data byte is not a CB(1), the signal CRITICAL is not asserted. Therefore, the controller and LSB MUX 112 multiplexes the signal at the LSB input, i.e., the LSB of the data byte, onto the LSB0 data line 120. The LSB of the received constrained data byte is placed on output D0 of the output port 118. Accordingly, the byte at the output port 118 is the same as the constrained data byte received by the decoder. This is the desired result, because non-CB data bytes, $d_k$, were not altered by the coder 12.

In the second case, the received constrained data byte placed on the first data bus 104 is a CB(1). Again, the first seven bits of the data byte are transferred to the lines $D_2(1)$-$D_2(7)$ of the second data bus 108 and placed on outputs D1-D7 of the output port 118 by the CB(1) detector 106 and the LSB of the data byte is routed to the LSB input of the controller and LSB MUX 112 on LSB line 113. In this case, the CB(1) detector asserts the signal CRITICAL and the signal at the $h_j$ input, $h_0$, is multiplexed onto the LSB0 line 120 and placed on output D0 of output port 118. Accordingly, the output byte at output port 118 is the same as the data byte received by the encoder 12 because the LSB of the constrained byte, $c_k$, has been replaced by the LSB of the data byte, $d_k$.

The SHIFT signal is generated so the next bit, $h_1$, in the constraint encoding byte is shifted to the serial output of the CB register 110. When the second CB(1) is received, its LSB will be replaced by $h_1$.

In general, the LSB of the jth CB(1) in the constrained data block is replaced by the stored LSB bit, $h_j$, of the constraint encoding byte, H. The SHIFT signal shifts the $h_j$s so that the signal on the $h_j$ line is $h_{j+1}$ to maintain the correspondence between the $h_j$s in the constraint byte and the CB(1)s in the received data block. The stored LSB in H converts the constrained CB(1) back to the value of CB in the unconstrained data block. For example, if the LSB of the unconstrained data block had been forced from "0" to "1," then the LSB in the constrained data byte, "1," is replaced by the original value of the LSB, "0," stored in the constraint encoding byte, H.

A pulse on the FSYNC line 117 signals the controller 112 to generate the load signal that loads the H byte in the CB register 110. The generation of these FSYNC pulses will now be described with reference to FIGS. 7A-D and 8.

In FIG. 7 a set of timing diagrams are depicted. FIG. 7A illustrates to organization of the data received at the decoder 16. Each frame 22 includes 48 bytes consisting of H, in the byte 0 position, followed by 47 constrained data bytes [$c_k$].

FIGS. 7B and C depicts signals generated by a T1 receiver 100. The signal CHSYNC is pulsed every 24 bytes and SBCLK changes state every time CHSYNC is pulsed. CHSYNC defines 24 byte frames utilized in a T1 system. The phase of SBCLK as arbitrary, relative to the constrained data format, and is depicted for both possible cases (A and B).

The signal CHSYNC is of no use for locating the H bytes since it is clocked for the byte 0 position, and the byte 24 position. However, the logical AND function of CHSYNC and SBCLK result in either the signal FSYNC(A) or FSYNC(B) (FIG. 7D) depending on the phase of SBCLK.

In this example, FSYNC(A) is pulsed when H is received and FSYNC(B) is pulsed when byte 24 is received.

FIG. 8 depicts a logic circuit for controlling the phase of SBCLK to pulse FSYNC in phase with the reception of H. In FIG. 8 a phase signal and SBCLK are routed to the inputs of XOR gate 130. The output of XOR gate 130 and CHSYNC are routed to the inputs of AND gate 132. The output of AND gate 132 is the FSYNC signal. If the value of the phase signal is "0," then the output of XOR gate 130 is SBCLK. If the value of the phase signal is "1," then the output of XOR gate 130 is SBCLK with its phase reversed. The functionality depicted in FIG. 8 is included in the sync logic unit 114.

Thus, the phase signal allows the decoder to select either the A or B phases of SBCLK to control the placement of the FSYNC pulses.

The value of the phase signal is determined by the controller 112. The H byte is generated at the encoder 12. The value of $h_6$ in the CB LSB register 64 (FIG. 5) is preset to "0." For randomized data, the probability of more than 3 or 4 CBs being present in a given 47 byte data block is remote. Thus, the value of a bit 6 in H is almost always "0." On the other hand, for a randomized data byte the probability of bit 6 being a "0" is ½.

In operation, the phase signal value is arbitrarily set and the value of the 6th bit of the byte loaded into the CB register is monitored for a selected period of time. Bit 6 is selected by the controller on the BIT6 line 115 when FSYNC is pulsed.

If the phase signal has positioned the FSYNC pulse to clock the H byte into the CB register 110, then the values of the monitored (bit 6)s are almost always 0 and the value of the phase signal is not changed.

However, if the phase signal has positioned the FSYNC pulse to clock byte 23 into the CB register, then the value of the monitored (bit 6)s will change between "0" and "1." This change is detected, the value of the phase signal is changed, and the FSYNC pulse is repositioned to clock H into the CB register 110.

Tables 1 and 2 list the components utilized in the coder and decoder, respectively, of one embodiment of the invention.

TABLE 1

| Circuit Element Design Rule For Coder. | | |
|---|---|---|
| Reference Number | Component Type | Component Model |
| 60 | PAL | 20L10 |
| 62 | PAL | 16R8A |
| 64 | PAL | 16R6A |
| 66 | Memory element | TM 2015 Ap-90 |
| 68 | Transmitter | 8050 |
| 76 | PAL | 16R6A |
| 84 | Counters | 74LS169 |

TABLE 2

| Decoder | | |
|---|---|---|
| Reference Number | Component Type | Component Model |
| 100 | Receiver | 8060 |
| 106 | PAL | 16L8A |
| 110 | Register | LS299 |
| 112 | PAL | 16R6A |

Circuit diagrams of both the coder and decoder, lists of PAL pinouts, state diagrams, and PAL equations are provided in an Appendix.

Preferred embodiments of the present invention have been described. Modifications to the embodiments described will be obvious to persons of ordinary skill in the art apprised of the present disclosure. In particular, the delay required to generate the coding byte, H, may be provided in the decoder. Alternative means for implementing the delay, such as a FIFO, may be implemented. While the invention has been described relative to the constraints of the T1 specification, it will have utility in systems having different constraints. The system may utilize words of arbitrary length having value $P_m$, m being the decimal value and $P_m$ being the binary equivalent. Additionally, high order bits other than bit 6 may be monitored to determine whether FSYNC has the proper phase. Accordingly, it is intended that the scope of the invention only be limited by the appended claims.

What is claimed is:

1. In a communication system for transmitting a word organized, constrained data block over a communication channel, where each data word is an ordered set of bits with the first bit in the set denoted the least significant bit (LSB) with the communication system of the type including a communication channel and that requires a minimum pulse density to maintain an acceptable error rate, a system for maintaining a minimum pulse density comprising:

encoder means, adapted to receive a word organized ordered data block and coupled to the communication channel, for detecting critical words in said data block having all non-LSB bits equal to zero, where an all zero critical word has an LSB equal to zero, for forming an LSB word including the LSBs of said detected critical words, with the order of the bits in the LSB word corresponding to the order of the detected critical words in the data block, for forcing the original LSB of an all zero critical word to a one to form a constrained critical word, for forming a data frame including said LSB word and a constrained ordered data block identical to the received data block except that each all zero critical word is replaced by a constrained critical word, and for transferring said data frame to the communication channel; and a decoder, coupled to the communication channel and adapted to receive said data frame, for changing the LSB of each constrained critical word to a zero.

2. The invention of claim 1 wherein said encoder means comprises:

means for storing the LSBs of said critical word to form said LSB word;

means for transferring the LSB of each detected critical word to said LSB storage means;

means for storing said constrained data block; and means for transferring said LSB word and transferring said constrained data block to said communication channel.

3. The invention of claim 2 wherein said decoder means comprises:

means for storing said LSB word; and means for receiving the data words in said constrained data block and replacing the LSB in each critical word with the corresponding bit in said stored LSB word.

4. The invention of claim 3 wherein:

said LSB word is transferred to the communication channel from said encoder means prior to the transfer of said constrained data block.

* * * * *

UNITED STATES PATENT AND TRADEMARK OFFICE
CERTIFICATE OF CORRECTION

PATENT NO. : 4,712,217
DATED : December 8, 1987
INVENTOR(S) : Thomas R. McPherson It is certified that error appears in the above-identified patent and that said Letters Patent is hereby corrected as shown below:

In the title Item (54), "Paulse" should read -- Pulse --.

Column 1, line 4, "Paulse" should read -- Pulse --.

Signed and Sealed this

Seventh Day of June, 1988

Attest:

DONALD J. QUIGG

Attesting Officer

Commissioner of Patents and Trademarks